Figure 1:
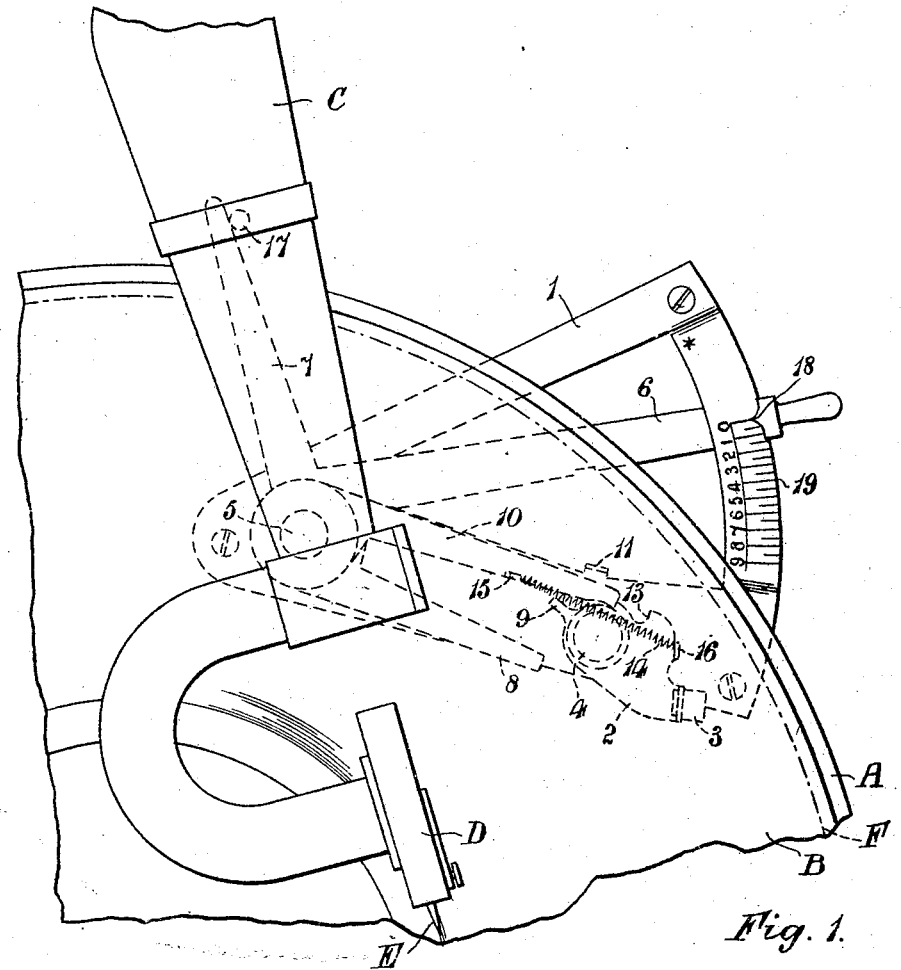

C. O. SCOTT.
BRAKE FOR TALKING MACHINES.
APPLICATION FILED NOV. 3, 1915.

1,203,418.

Patented Oct. 31, 1916.

WITNESSES.
M. J. Andrews.

INVENTOR.
Chas. O. Scott.
By Stanley Lightfoot
ATTORNEY.

UNITED STATES PATENT OFFICE.

CHARLES O. SCOTT, OF GANANOQUE, ONTARIO, CANADA, ASSIGNOR OF ONE-HALF TO JOHN W. SCOTT, OF NORTH BAY, ONTARIO, CANADA.

BRAKE FOR TALKING-MACHINES.

1,203,418.   Specification of Letters Patent.   Patented Oct. 31, 1916.

Application filed November 3, 1915. Serial No. 59,477.

*To all whom it may concern:*

Be it known that I, CHARLES O. SCOTT, of the town of Gananoque, in the county of Leeds, in the Province of Ontario, in the Dominion of Canada, have invented certain new and useful Improvements in Brakes for Talking-Machines, and do hereby declare that the following is a full, clear, and exact description of same.

This invention relates to talking machine brakes of the type adapted to control the starting and stopping of the rotation of the record carrying member of such talking machines the stopping of such rotation being automatically effected as the needle or reproducing point of the machine assumes a predetermined position upon the record, the object of the invention being to provide means whereby the release of the brake to allow the rotation of the record carrying member may be effected simultaneously with the adjustment of the means determining the position of the reproducer point at the moment when the cessation of such rotation of the said record carrying member is desirable.

A resultant object is to provide a brake operating member which is associated with means to automatically effect the release of said brake as hereinafter explained.

A further object is to provide registering means to indicate at what point in the operation of the machine the brake will be released to stop rotation of the record carrying member; and a still further object is to provide simplicity of operation in the device whereby movement in a forward and reverse direction of the brake operating member will be attended with the release of the record carrying member and the adjustment of the brake releasing mechanism.

In carrying the invention into effect I prefer to provide a base plate of quadrant form having near its apex a pivot upon which a three membered device is mounted, the intermediate member extending outwardly beyond the periphery of the quadrant and having the form of a lever adapted to be manually operated, hereinafter called the operating lever, the other of said members being hereinafter called the "trip arm" and the "brake arm" respectively. A further member, hereinafter called the "pawl arm", is also mounted upon said pivot and is frictionally associated with the first mentioned three membered device. A brake, adapted to frictionally operate upon the record carrying member, is pivotally mounted upon said base plate and somewhat in proximity to the outer edge of the quadrant, the said brake being in the form of a flat plate carrying at its outer end the rubber or other means t> engage with the record carrying member and having two recesses in proximity to the pivot in one or other of which recesses the outer end of the pawl arm may engage, resilient means being provided to retain the said pawl arm and the brake in their active relation. The brake is also provided with a projection which extends into the path of the brake arm whereby movement of the operating lever away from the brake will result in the engagement of the said brake arm with the said projection and the incidental movement of the brake, upon its pivot, to release the record carrying member, upon which movement of the said brake, the pawl arm will engage with one of the recesses to retain said brake in its inoperative position. The movement of the operating lever naturally entails the movement of the trip arm and will thereby effect an adjustment of the relation between the said trip arm and the sound arm of the talking machine which is desirable, and as the reverse movement of the said operating lever will not effect the operation of the brake, the adjustment of the trip arm may be made to any desired extent. A suitable trip is provided in connection with the sound arm of the machine to contact with the trip arm, as the reproducer point moves over the record and will result in the release of the brake, all of which is more particularly described and ascertained in and by the following specification and with reference to the accompanying drawing in which—

Figure 2:
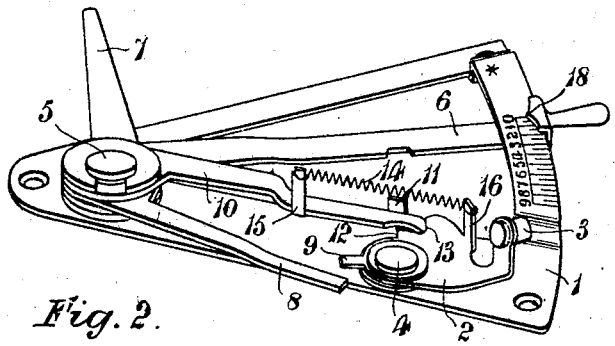

Figure 1 is a plan view of a disk talking machine partly broken away indicating the application of this invention thereto, and Fig. 2 is a detail perspective view of the brake mechanism detached from the machine.

Similar characters of reference indicate similar parts in both figures of the drawing.

A is the usual rotary record carrying member or table and B a disk record mounted thereon, while C is the sound arm of a talking machine to which is connected the reproducer, D carrying the needle E, the parts A, B, C, D and E being well known and therefore not requiring further explanation.

The table is usually supported slightly above the top of a motor casing and upon this casing and more or less beneath the table A, I prefer to mount the brake mechanism constituting this invention.

This brake comprises preferably a quadrant shaped base 1 upon which a brake proper 2 is pivotally mounted, the said brake proper carrying the rubber 3, the term rubber being intended to indicate the function of the integer 3 and not the material of which it is composed.

4 is the brake pivot and 5 is a further pivot located in proximity to the apex of the base 1, as is illustrated in the drawing. the said pivot 5 forming the turning point for an operating lever 6, the outer end of which lever extends somewhat beyond the periphery of the quadrant. Integral with or rigidly connected with the said operating lever 6 is a trip arm 7 and a brake arm 8 preferably disposed so that the operating lever 6 is intermediate of said arms. The other end of the brake arm 8 is adapted when moved in an anti-clockwise direction (where the parts are arranged as indicated in the drawings) to contact with a projection 9 upon the brake 2 for the purpose hereinafter described.

10 is a pawl arm also mounted upon pivot 5 and frictionally associated with the trip arm 7, whereby movement of the said trip arm will be transmitted to the pawl arm to an extent limited by the stop 11 upon the base 1.

It will be seen that the brake is provided with recesses 12 and 13 with either of which recesses the extremity of the said pawl arm 10 may engage according to the position of the brake.

14 is a spring extending between projections 15 and 16 upon the pawl arm and brake respectively the said spring being in a state of tension.

17 is a pin which depends from the sound arm C to contact with the trip arm 7 as hereinafter described, this pin being merely indicated in dotted lines in Fig. 1 as being well understood.

The outer end of the operating lever is provided with a pointer 18 adapted to register with graduations 19 upon the quadrant according to the position of the lever.

The operation of the device will now be described;—Presuming that the parts are in the position indicated in Fig. 2, in which it will be seen that the rubber 3 is in a forward position, in which position under the influence of the spring 14 it would frictionally abut with the inside edge of the rim, usually found upon the underside of circular record tables, (this rim being indicated in Fig. 1 of the drawing by the chain line F) such frictional abutment preventing the rotation of the said table, the operating lever 6 is moved away from the brake 2 to an extent which may be limited by suitable means or which may be indicated by a star upon the quadrant as is indicated in the drawing. This movement of the operating lever is attended by movement to a similar extent of the trip arm 7 and the brake arm 8 whereby the said brake arm will contact with the projection 9, upon the brake 2, and effect the movement of the said brake to the position as indicated in Fig. 1 when the extremity of the pawl arm 10 will engage with the recess 12 in the said brake by virtue of the action of the spring 14.

The movement of the brake to an inoperative position permits the record table to rotate, and as the sound arm C carrying the pin 17 swings, due to the movement of the needle E over the face of a record, the said pin 17 will eventually contact with the trip arm 7 at a point determined by the position of the trip arm, which position of the trip arm is also determined by the movement of the operating lever in an opposite direction to that necessary to bring the brake into its inoperative position or until the pointer 18 upon the operating lever 6 registers with one or other of the graduations upon the quadrant, the graduations being such that the point marked "O" will indicate that, when the pointer registers therewith, the trip arm is in such a position that the pin 17 will contact therewith upon the needle E approaching a determined radius from the center of the record.

The radius conforming with the graduation "O" represents the nearest line of sound waves to the center of the record usually found, the further graduations indicating various radii of sound wave lines at which point in reproduction contact between the said pin 17 and the trip arm 7 will take place. Thus upon the movement of the operating lever, until the pointer registers at one or other of the graduations, the brake arm 8 will be moved away from the projection 9, upon the brake 2, and the trip arm 7 brought to its adjusted position, and when the needle E has traveled across the record until it assumes the radial position indicated by the pointer 18, the pin 17 will contact with the trip arm 7 and thereby slightly move the said arm in an anti-clockwise direction when the pawl arm will be sprung from its engagement with the recess 12, due to the frictional relation of the pawl arm and said trip arm, the brake thus returning to its operative position under the influence of the spring 14 and preventing further rotation of the record table. Hence the cessation of the rotation of the record table automatically takes place as the playing of the record or a part of the record is completed, as may be desired. It is suggested that the records should be numbered in order to indicate the radius of the final sound wave lines, or of sound wave lines representing the completion of a part of the record, such as one verse of a song, these numbers conforming with the particular graduations upon the quadrant to which they relate.

With a device of this description an extremely simple structure is provided having but one spring operating both the pawl arm and the brake, and an extremely simple operation of the operating lever is necessary in order to release the record carrying table and to regulate the trip arm, and it will also be understood that the stopping of the rotary movement of the record table may be readily effected irrespective of the automatic stopping, if desirable, merely by a slight movement of the operating lever in the direction of the star indicated upon the quadrant, whereby the pawl arm will be frictionally moved out of its engagement with the recess 12.

This invention may be developed within the scope of the following claims without departing from the essential features thereof and it is desired that the specification and drawing be read as being merely illustrative and not in a limiting sense, except as necessitated by the prior art.

What I claim as my invention is:

1. In a talking machine brake, a brake proper, means to temporarily retain said brake proper in an inoperative position, a brake arm, a trip arm, an operating lever adapted to positively actuate said brake arm and said trip arm, and a pawl arm frictionally associated with said trip arm said pawl arm determining the position of the said brake proper.

2. A talking machine brake comprising a brake proper, means to temporarily retain said brake proper in an inoperative position, a brake arm, a trip arm, an operating lever adapted to positively actuate said brake arm and said trip arm, a pawl arm frictionally associated with said trip arm to determine the position of said brake proper and a tensioned resilient member tending to retain said pawl arm and said brake proper in active relation.

3. In a talking machine brake, a brake setting mechanism adapted to retain said brake temporarily in an inoperative position, a brake releasing mechanism adapted to operate automatically at a predetermined time to release said brake, a single lever, the operation of which will effect both the inoperative setting of said brake and the determining of the subsequent operation of said brake releasing mechanism, and a graduated member with which said lever registers to indicate the moment of release of said brake proper.

4. In a talking machine brake, a brake proper, means to temporarily retain said brake proper in an inoperative position, a brake arm, an operating lever adapted to positively actuate said brake arm and said trip arm, a pawl arm frictionally associated with said trip arm, said pawl arm determining the position of the said brake proper, and a graduated member with which said lever registers to indicate the moment of release of said brake proper.

5. A talking machine brake comprising a brake proper, means to temporarily retain said brake proper in an inoperative position, a brake arm, a trip arm, an operating lever adapted to positively actuate said brake arm and said trip arm, a pawl arm frictionally associated with said trip arm to determine the position of said brake proper, a tensioned resilient member tending to retain said pawl arm and said brake proper in active relation, and a graduated member to indicate by the position of said lever the moment of release of said brake proper.

6. A talking machine brake comprising a brake proper, means to temporarily retain said brake proper in an inoperative position, a brake arm, a trip arm, an operating lever integral with said brake arm and said trip arm, and a pawl arm frictionally associated with said trip arm, said pawl arm determining the position of the said brake proper.

Signed at the town of Ganonoque, in the county of Leeds, in the Province of Ontario, in the Dominion of Canada, this 21st day of October, 1915.

CHARLES O. SCOTT.

Witnesses:
BERTHA SULLIVAN,
G. BEIFER.